United States Patent
Tsukamoto et al.

[11] 3,907,522
[45] Sept. 23, 1975

[54] METHOD FOR REMOVING A FLUORINE COMPOUND(S) FROM GASEOUS MIXTURE THEREWITH

[75] Inventors: Youji Tsukamoto; Sadao Kondo, both of Kurashiki, Japan

[73] Assignee: Mitsubishi Gas Chemical Co., Inc., Tokyo, Japan

[22] Filed: Apr. 26, 1974

[21] Appl. No.: 464,321

[30] Foreign Application Priority Data
May 10, 1973 Japan.............................. 48-51833

[52] U.S. Cl. ............................ 55/71; 55/90; 55/94
[51] Int. Cl.[2] ........................................ B01D 50/00
[58] Field of Search ............ 55/71, 90, 93, 94, 233; 423/240, 293, 287; 261/94

[56] References Cited
UNITED STATES PATENTS

| | | | |
|---|---|---|---|
| 2,947,383 | 8/1960 | Schytil et al. | 55/73 X |
| 3,302,372 | 2/1967 | Hynson et al. | 261/94 X |
| 3,445,182 | 5/1969 | Tomany | 261/94 |
| 3,492,789 | 2/1970 | Jueng | 55/94 |

*Primary Examiner*—Thomas G. Wyse
*Assistant Examiner*—Ethel R. Cross
*Attorney, Agent, or Firm*—Flynn & Frishauf

[57] ABSTRACT

In a method for removing fluorine compound(s) from gaseous mixture therewith, the mixture is at first introduced to a gas scrubber of gas-liquid contacting type and then it is characterized in that the gas removed from the scrubber is introduced to a mist-catching means, said means comprising a porous filter medium in a film state having pores of a mean size of not more than $60\mu$ and a nozzle or nozzles positioned above the surface of the medium, which can spray water or an aqueous alkaline solution on the surface of the filter medium into substantially the same direction as that of the stream of the gas, and liquid being sprayed continuously or intermittently. This invention is useful for removing a boron fluoride from gas.

11 Claims, 1 Drawing Figure

METHOD FOR REMOVING A FLUORINE COMPOUND(S) FROM GASEOUS MIXTURE THEREWITH

BACKGROUND OF THE INVENTION

This invention relates to a method for removing a fluorine compound(s), particularly a boron fluoride from a waste gas containing the fluorine compound or compounds, such as hydrogen fluoride or boron fluorides.

Air pollution by a waste gas containing fluorine and/or fluorine compounds causes a social problem, since fluorine and the fluorine compounds are harmful to human beings, animals and plants. Therefore, a variety of research for preventing such air pollution have been made. Among fluorine and fluorine compounds, hydrogen fluoride is widely used or by-produced in a variety of industries, such as inorganic and organic chemical industries, metal smelting industry and pottery industry; and boron tri-fluoride is used in increasing applications, such as polymer manufacturing industry and petrochemical industry. As mentioned above, fluorine compounds are harmful to human beings, animals and plants, so processes using the compounds and processes forming fluorine compounds as byproducts should be carried out in closed loop system to prevent the leakage of the fluorine compounds out of the processes. A variety of attempts have been made for attaining this object.

In general, it is well known that since hydrogen fluoride and boron fluoride are very water-soluble, a hydrogen fluoride-containing waste gas is washed with water, thereby removing hydrogen fluoride contained in the waste gas. For example, INDUSTRY AND ENGINEERING CHEMISTRY Vol. 46, No. 9, pages 1769 – 1777 (1954) discloses that removal of hydrogen fluoride from a hydrogen fluoride-containing waste gas can be attained in high efficiency by using a Saran fiber filter in a wet state as an absorbing bed. However, this process was not believed to be effective for removing hydrogen fluoride from a mixture of hydrogen fluoride and a large amount of an inert gas diluent.

As mentioned, a boron fluoride has high watersolubility like hydrogen fluoride. Therefore, it is assumed that when a waste gas containing a boron fluoride is washed with water, a boron fluoride would be easily absorbed by the water.

Contrary to expectation, it was found that a boron fluoride is not efficiently absorbed by water. That is, it has been found that even when a boron fluoride diluted with an inert gas, such as air is washed with water by gas-liquid contact in a gas scrubber, such as a packed tower, a tower having multi plates, a fluidized bed and the like, absorption efficiency of the boron fluoride is very low. This fact would be realized by the result that the absorption efficiency by means of a gas scrubber with a fluidized bed using an aqueous calcium hydroxide solution was measured in an amount of more than 95% for hydrogen fluoride, whereas about 30% for a boron fluoride.

On the basis of the difference between these absorption efficiencies, we have had the following four findings: (a) a boron fluoride has an affinity for water to easily form a boron fluoride hydrate, (b) it is difficult to catch the boron fluoride hydrate so formed by an absorption medium, (c) when the hydrate contacts with the absorption medium, mist is formed and (d) the mist tends to fly with the waste gas from the absorption zone without being absorbed by the treating solution. As a result, the absorption efficiency for a boron fluoride is poor.

Making a variety of attempts for increasing the absorption efficiency for a boron fluoride on the basis of the above findings, we have found a method for efficiently absorbing a boron fluoride. This invention forms the basis of this discovery.

Accordingly, it is an object of the invention to provide a method for efficiently removing a substantial amount of a fluorine compound(s), particularly a boron fluoride, from a waste gas containing a fluorine compounds.

It is a further object of the invention to provide a method capable of absorbing a boron fluoride without flying such boron fluoride hydrate mist with the gas.

Other objects of the invention will in part be obvious and will in part appear hereinafter.

SUMMARY OF THE INVENTION

This invention is in detail explained on the basis of the following embodiment.

A fluorine compound(s)-containing gas is passed through a gas scrubber of gas-liquid contacting type, such as a packed tower, a tower having multi plates, a fluidized bed or the like to perform a gas-liquid contact, thereby removing a portion of the compound(s) from the gas and then the gas so treated is passed through a mist-catching means comprising a porous filter medium in a filmy state having pores with a mean size of not more than $60\mu$ and a nozzle or nozzles positioned above the surface of the filter medium, which can continuously or intermittently spray water or an aqueous alkaline solution on the surface of the filter medium into substantially the same direction as that of the stream of the gas, thereby removing a substantial amount of fluorine compound(s) from the gas. According to the method of this invention, a boron fluoride which can not be efficiently absorbed by water, as well as hydrogen fluoride diluted with a large amount of an inert gas, are efficiently fixed or caught. That is, according to this invention, hydrogen fluoride and/or a boron fluoride is substantially removed from a waste gas containing the same.

DETAILED DESCRIPTION OF THE INVENTION

Figure 1:
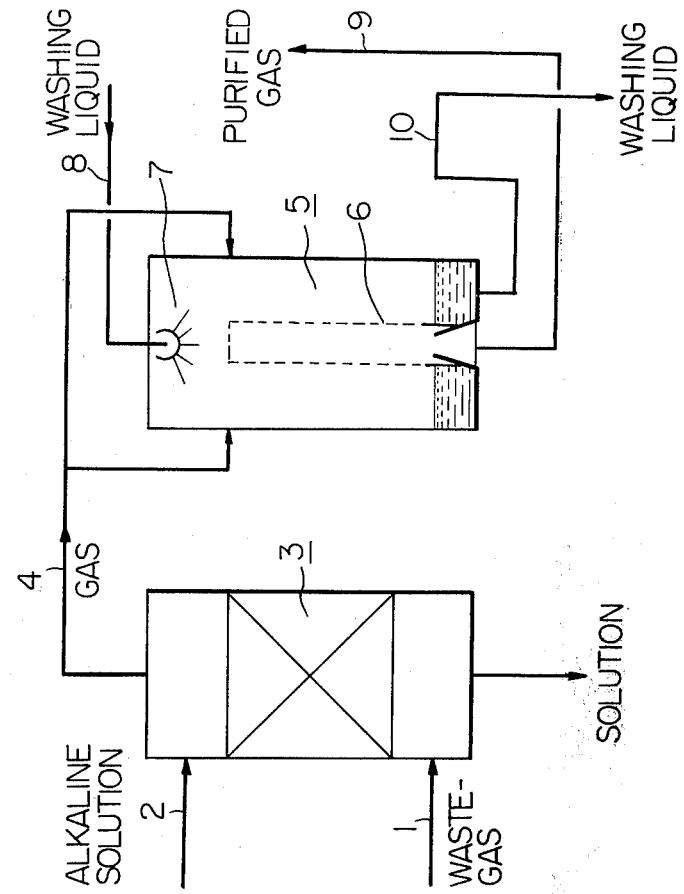

The inventors of this invention have made an extended study of the kinds of raw material, the forms and the mean size of filter pores most suitable for a filter in the filter medium of this invention in order to catch fluorine compound(s)-containing mist, particularly a boron fluoride hydrate mist, produced by passing a waste gas through a gas scrubber described above.

The filter medium employed for carrying out the method of this invention is a porous sheet material or a porous material in a filmy state having pores of a mean size of not more than $60\mu$; and a mean size of about $20 - 60\mu$ being preferable, the range of about $20 - 40\mu$ being most satisfactory. It is preferable that the porous filter medium is prepared by compression-sintering a powder comprising a raw material for the filter medium. The size of the pores in the porous filter medium can be adjusted by controlling the particle size of the powder to be sintered, the pressure of compression molding and sintering conditions.

Since the mist to be treated is a boron fluoride and/or hydrogen fluoride, the raw material for the filter should be corrosion-resistant. Suitable materials include fluorine-containing resins, such as polytetrafluoro ethylene resin; polyolefin resins such as polyethylene or polypropylene; and polyvinylidene chloride resin. Polyethylene is preferred as the material. When a waste gas not containing hydrogen fluoride is treated, glass may also be used as a material for filter.

A woven fabric, a non-woven fabric or a felt having a corrosion-resistance instead of the porous filter medium used in the method of this invention is improper for use as a filter. The reasons are as follows:

The boron fluoride hydrate mist to be caught by the filter is a viscous liquid; and spraying of water or an alkaline aqueous solution is essentially required. Then, when a waste gas containing the mist is treated by passing it through the filter in the form of the fabric or felt described above, the mist and water or the aqueous solution clogs some of the gas-passing pores present in the filter, thereby resulting in increasing the resistance to passage of the gas through the filter. Simultaneously, the increase of the resistance to passage of the gas causes expansion of the non-clogged pores remaining in the filter and make the gas pass only through the pores, thereby giving rise to a localized flow of the gas. Therefore, in a case using a filter in the form of the fabric or felt, not only pressure loss results from the reduction of the number of effective pores, but also efficiency of holding the mist is lowered because of the expansion of the gas-passing pores.

On the other hand, the porous filter medium mentioned above employed in this invention does not have the above disadvantages. Therefore, the filter medium of this invention can efficiently catch a boron fluoride and/or hydrogen fluoride-containing mist.

From the results of our experiments, the range of the mean size of the pores in the filter medium as mentioned above has been found to be critical. That is, the range was decided on the basis of the pressure loss and the efficiency for holding the mist.

Furthermore, in the practice of this invention, the surface of the porous filter medium for catching the mist should be continuously or intermittently washed with water while the gas is passing through the filter. Washing is particularly effective for catching the boron fluoride-containing mist, because blockage of the pores resulting from viscousness of boron fluoride hydrate is prevented by the washing. The amount of water used depends on the proportion of the fluorine compounds contained in the waste gas, the amount of waste gas passed, the mean size of the pores and the distribution of water droplets on the surface of the filter. It may be enough to say that the lower limit of the amount is to remove the mist held by or absorbed in the pores. The higher limit of the amount is decided from the economic viewpoint.

The particular amount of water used is more than about 0.1, preferably 1 to 5 mole, per a mole of a boron fluoride hydrate contained in the waste gas treated.

Though the waste gas may contain a small amount of solids with the mist according to circumstances, such solids can be easily removed from the pores by using treating solutions other than water, whereby blockage of the filter by the solids can be prevented. To the best of our knowledge from such facts, spraying of water or an aqueous alkaline solution on the filter as in this invention is believed to serve as a washing step to remove the mist absorbed on the surface of the filter rather than serves to clean the waste gas by a direct contact with the gas.

Water or an aqueous alkaline solution should be sprayed on the surface of the filter medium into substantially the same direction as that of the stream of the gas.

Both the gas and water or the alkaline solution are passed as streams from the upper portion of the mist-catching means to the lower portion thereof. That is, the stream of the gas is not in countercurrent relation with that of the liquid.

In order to uniformly distribute water over the surface of filter for production on commercial basis, it is preferable to spray the water or the solution in a state of fog on the surface from nozzle(s).

In the practice of this invention, an absorbing medium used in the mist-catching means may be water or an aqueous alkaline solution, such as an aqueous solution of a hydroxide or carbonate of alkali metal or alkali earth metal.

In operating the mist-catch means employed in this invention, the inside temperature of the means is not critical. Generally speaking, the inside temperature of the means is desired to be low, due to the reasons that a fluorine compound, particularly a boron fluoride hydrate contained in the gas removed from the gas scrubber, is easily formed as a mist to be caught by the filter medium, and that a washed solution containing fluorine compounds corrodes the filter at higher temperatures. However, the operation can be carried out even at an elevated temperature by using a means having a great corrosion-resistance or at a higher superpressure.

FIG. 1 is a flow sheet showing the embodiment of this invention. In FIG. 1, line 1 for introducing a waste gas to be treated, line 2 for introducing water or an aqueous alkaline solution, gas scrubber 3, line 4 for withdrawing the gas so treated from scrubber 3 and introducing it to mist-catching means 5, porous filter medium 6, nozzle 7 for spraying water or an aqueous alkaline solution, line 8 for introducing water or the solution to means 5, line 9 for withdrawing the treated gas and line 10 for withdrawing the washing solution from means 5 are shown.

A portion of the fluorine compounds contained in the waste gas is removed from the gas in gas scrubber 3 by gas-liquid contact and then the gas so treated is fed through line 4 from scrubber 3 to means 5. In means 5, a substantial amount of fluorine compound(s), particularly a boron fluoride hydrate contained in the waste gas is removed from the gas by passing the gas through filter medium 6. The fluorine compound(s) mist which is absorbed in the pores in the filter is washed with water or the alkaline solution.

In the mist-catching means as explained above, the filter medium is produced by shaping a porous filter sheet into a cylinder. The diameter and length of the cylinder, and the number of the cylinders are selected so that a desired filter surface area may be obtained. Furthermore, the length of the cylinder may be determined by the spraying effect of the liquid. The diameter of the cylinder may be determined by the thickness of the filter sheet and strength thereof. The number of the cylinders may be decided on the basis of the dispersing state of gas to be treated and the ability of spray 7 for spraying liquid. The cylinder(s) is so arranged as to be positioned vertically in means 5. Means 5 may be designed so that the gas to be treated is passed through the filter from the outside surface of the cylinder to the inside thereof, while water or an aqueous alkaline solution in a fog state is sprayed on the surface of the filter into substantially the same direction as that of the stream of the gas. The wash water or the alkaline solution is stored in the bottom outside the vertically positioned cylinder(s). The form of the filter medium may be a square pillar or a plate. A cylindrical form is preferred.

It is preferable to introduce the gas to the mist-catching means through the inlet for gas positioned above the filter medium, while continuously or intermittently spraying on the surface of the medium water or the aqueous alkaline solution from a nozzle positioned above the filter medium.

When some pores in the medium clog and the pressure loss resulting therefrom becomes significant, the gas can not pass through the medium. In order to solve this problem, for example, the inside pressure of the closed means 5 is increased through reduction of its inside capacity by elevating the level of water or the solution stored at its bottom. By so doing, it becomes possible to make the gas pass through the medium, the pressure loss mentioned above notwithstanding. In general, the inside pressure of the closed means may be selected from a superpressure of less than 20 kg/cm$^2$ gauge.

Alternatively, the pressure loss may be compensated for by maintaining the outlet for gas of the cylindrical filter at a reduced pressure, that is, by sucking the gas from the outlet for gas of the means. In this case the inside pressure of the means 5 may be kept at a reduced pressure selected from a reduced pressure of more than 200 mmHg, during the time when the gas is sucked from the means.

As explained above, the present invention is very useful for treating a waste gas containing fluorine compounds, particularly a boron fluoride, which can not be removed by a conventional gas scrubber of gas-liquid contacting type, because of formation of a boron fluoride hydrate mist. This invention is also useful for removing hydrogen fluoride from a waste gas comprising a mixture of hydrogen fluoride with a large volume of an inert gas. Of course, the present invention is also useful for treating a waste gas containing a boron fluoride and hydrogen fluoride.

Therefore, this invention can substantially prevent air pollution. Significance of this invention for industry is great.

The invention is further illustrated, but in no way limited, by the following examples.

In the following examples, a fluorine fraction was measured on the basis of "Analytical method for determination of fluorine compounds in exhaust gas" described in JIS (Japanese Industrial Standard) K 010.5.

EXAMPLE 1

In the flow sheet of FIG. 1, a boron trifluoride gas diluted with air was fed to gas scrubber 3 comprising a packed tower through line 1, and an aqueous alkaline solution was fed to scrubber 3 through line 2. The gas was allowed to contact with the solution by countercurrent system in gas scrubber 3. The gas so treated was withdrawn from scrubber 3 through line 4 and fed to mist-catching means 5. Porous filter medium 6 in a cylindrical form made from polyethylene was arranged in means 5. The filter has pores of a mean size of about $20 - 30\mu$. The washing solution was sprayed from nozzle 7 mounted on the top of means 5.

The effect of washing boron trifluoride-containing gas was determined by measuring fluoride fractions contained in the treated waste gas withdrawn from line 9. The results are shown in Table 1. In Table 1, the fluorine fractions contained in the gas were calculated in mg F$^-$/N m$^3$ unit, Table 1

| amount of gas passed through filter (Nm$^3$/hr) | linear velocity of gas based upon the unit area of the surface of the filter medium (m/min) | concentration of fluorine fraction contained in the gas at the inlet of means 5 (mgF$^-$/N m$^3$) | concentration of fluorine fraction contained in the gas at the outlet of means 5 (mg F$^-$/N m$^3$) | absorption efficiency (%) |
|---|---|---|---|---|
| 1.2 | 1.0 | 483 | 3.07 | 99.36 |
| 1.8 | 1.5 | 490 | 2.90 | 99.40 |
| 2.8 | 2.0 | 483 | 3.81 | 99.21 |
| 1.2 | 1.0 | 32.9 | 0.68 | 97.93 |
| 1.8 | 1.5 | 33.1 | 1.12 | 96.62 |
| 2.4 | 2.0 | 32.5 | 0.89 | 97.26 |

EXAMPLE 2

The process of Example 1 was repeated with a waste gas containing equimolar amounts of each of boron trifluoride and hydrogen fluoride with air diluent except that the treatment in means 5 was carried out at a reduced pressure by using a blower (not shown) connected with line 9 and the mean size of the pores was about $40 - 50\mu$. The results are shown in Table 2.

Table 2

| amount of gas passed through filter (Nm$^3$/hr) | linear velocity of gas based upon the unit area of the surface of the filter medium (m/min) | concentration of fluorine fraction contained in the gas at the inlet of means 5 (mg F$^-$/N m$^3$) | concentration of fluorine fraction contained in the gas at the outlet of means 5 | absorption efficiency (%) |
|---|---|---|---|---|
| 1.8 | 1.5 | 144 | 0.42 | 99.71 |

Table 2 —Continued

| amount of gas passed through filter (Nm³/hr) | linear velocity of gas based upon the unit area of the surface of the filter medium (m/min) mg F⁻/N m³) | concentration of fluorine fraction contained in the gas at the inlet of means 5 (mg F⁻/N m³) | concentration of fluorine fraction contained in the gas at the outlet of means 5 (%) | absorption efficiency |
|---|---|---|---|---|
| 3.0 | 2.5 | 144 | 0.64 | 99.56 |
| 3.7 | 3.08 | 144 | 0.69 | 99.52 |

EXAMPLE 3

The apparatus employed was the same as in Example 1, but was so large as to enable the treatment of 750 N m³/hr. of gas which contained 250 mg F⁻/N m³ of the combined amount of a boron fluoride and hydrogen fluoride as a total fluorine fraction.

An aqueous alkaline solution was used as a gas-absorbing medium to fix a portion of the fluorine compound. At least two porous filter mediums made from polyethylene in a cylindrical from, and having pores with a mean size of about 30 – 40μ were arranged in means 5 so that the filter area was 8 square meters. The solution used was sprayed on the filter at the rate of 0.5 m³/hr. The total fluorine fraction contained in the gas withdrawn from the mist-catch means was 0.7 mg F⁻/N m³.

What is claimed is:

1. A method for removing fluoride compounds comprising hydrogen fluoride and boron fluoride from a gaseous mixture containing the same, chracterized by introducing said gaseous mixture to a gas scrubber of gas-liquid contacting type, thereby removing from the gaseous mixture a portion of the fluoride compounds, and then delivering the so treated gaseous mixture, which contains fluoride compounds substantially comprising boron fluoride hydrate in mist form, to a mist-catching means comprising a porous filter medium in a filmy state having pores of a mean size of not more than 60 μ and one or more nozzles positioned above the surface of the medium, continuously or intermittently spraying water or an aqueous alkaline solution on the surface of the filter medium in substantially the same direction as that of the treated gaseous mixture, thereby removing a substantial amount of boron fluoride in the form of a hydrate from said gaseous mixture.

2. The method defined in claim 1, wherein the porous filter medium has pores of a mean size of about 20 – 60 μ.

3. The method defined in claim 1, wherein the porous filter medium has pores of a mean size of about 20 – 40 μ.

4. The method defined in claim 1, wherein the aqueous alkaline solution is an aqueous solution of a hydroxide or a carbonate of an alkali metal or an alkaline earth metal.

5. The method defined in claim 1, wherein the filter in the porous filter medium is a porous filmy material prepared by compressionsintering of powders comprising a raw material selected from the group consisting of fluorine-containing resins, polyolefin resins, polyvinylidene chloride resin and glass.

6. The method defined in claim 1, wherein the filter is a polyethylene filter.

7. The method defined in claim 1, wherein the filter in the porous filter medium is cylindrical.

8. The method defined in claim 1, wherein in the mist-catching means one or more inlets for the gaseous mixture removed from the gas scrubber is positioned above the filter medium.

9. The method defined in claim 1, wherein the mist-catching means is so operated that the inside pressure of the means is a superpressure of less than 20 kg. per square centimeter gauge.

10. The method defined in claim 1, wherein the mist-catching means is so operated that the inside pressure of the means is kept at a reduced pressure of more than 200 mmHg. during the time when the gas is sucked from said means.

11. The method defined in claim 1, wherein an amount of water or an aqueous alkaline solution sprayed on the surface of the filter medium is more than 0.1 mole per mole of a fluoride hydrate contained in the gaseous mixture removed from the gas scrubber.

* * * * *

UNITED STATES PATENT AND TRADEMARK OFFICE
CERTIFICATE OF CORRECTION

PATENT NO. : 3,907,522
DATED : September 23, 1975
INVENTOR(S) : YOUJI TSUKAMOTO et al It is certified that error appears in the above-identified patent and that said Letters Patent are hereby corrected as shown below:

Column 1, line 38: replace "Saran" with -- SARAN --.

Column 6, Table 2, second column heading, last two lines: delete "mg $F^-$/N $m^3$)".

Column 6, Table 2, fourth column heading, last line: delete "(%)", and insert -- (mg $F^-$/N $m^3$) --.

Column 6, Table 2, fifth column heading, last line: insert -- (%) --.

Column 7, Table 2 continuation, second, fourth and fifth column headings, same as 2), 3) and 4).

Signed and Sealed this

*thirtieth* Day of *March 1976*

[SEAL]

Attest:

RUTH C. MASON
*Attesting Officer*

C. MARSHALL DANN
*Commissioner of Patents and Trademarks*